United States Patent
Fujimori

(10) Patent No.: US 11,709,627 B2
(45) Date of Patent: Jul. 25, 2023

(54) RECORDING CONTROL APPARATUS FOR ACCESSING A PLURALITY OF RECORDING MEDIA AND METHOD FOR CONTROLLING SAID RECORDING CONTROL APPARATUS

(71) Applicant: CANON KABUSHIKI KAISHA, Tokyo (JP)

(72) Inventor: Soya Fujimori, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 250 days.

(21) Appl. No.: 17/189,071

(22) Filed: Mar. 1, 2021

(65) Prior Publication Data

US 2021/0279006 A1    Sep. 9, 2021

(30) Foreign Application Priority Data

Mar. 5, 2020   (JP) ................................. 2020-038003

(51) Int. Cl.
    *G06F 3/06*   (2006.01)
    *G01K 1/022*  (2021.01)

(52) U.S. Cl.
    CPC .......... *G06F 3/0659* (2013.01); *G01K 1/022* (2013.01); *G06F 3/0604* (2013.01); *G06F 3/0653* (2013.01); *G06F 3/0679* (2013.01)

(58) Field of Classification Search
    CPC ....... G01K 1/022; G06F 3/0604; G06F 3/061; G06F 3/0616; G06F 3/0632; G06F 3/0653; G06F 3/0659; G06F 3/0679
    See application file for complete search history.

(56) References Cited

U.S. PATENT DOCUMENTS

| | | | |
|---|---|---|---|
| 6,772,352 B1* | 8/2004 | Williams | G11C 11/406 713/300 |
| 2006/0064999 A1* | 3/2006 | Hermerding | G06F 1/324 236/49.3 |
| 2015/0346800 A1* | 12/2015 | Kumar | G06F 1/3206 713/323 |
| 2016/0062421 A1* | 3/2016 | Sugawara | G06F 1/3268 700/299 |

FOREIGN PATENT DOCUMENTS

JP    2017005323 A    1/2017

* cited by examiner

*Primary Examiner* — Larry T Mackall
(74) *Attorney, Agent, or Firm* — Canon U.S.A., Inc. IP Division

(57) ABSTRACT

A recording control apparatus configured to access a plurality of recording media, includes a control unit configured to set a temperature threshold of each of first and second recording media, a functional restriction being imposed on the recording medium at the temperature threshold, wherein the control unit is configured to, in recording data read from the first recording medium into the second recording medium, make a first setting for the first recording medium and a second setting for the second recording medium, where the first setting includes setting the temperature threshold of the recording medium at which the functional restriction is imposed on the recording medium to a default value of the recording medium, and the second setting includes setting the temperature threshold of the recording medium at which the functional restriction is imposed on the recording medium to a value greater than the default value of the recording medium.

17 Claims, 8 Drawing Sheets

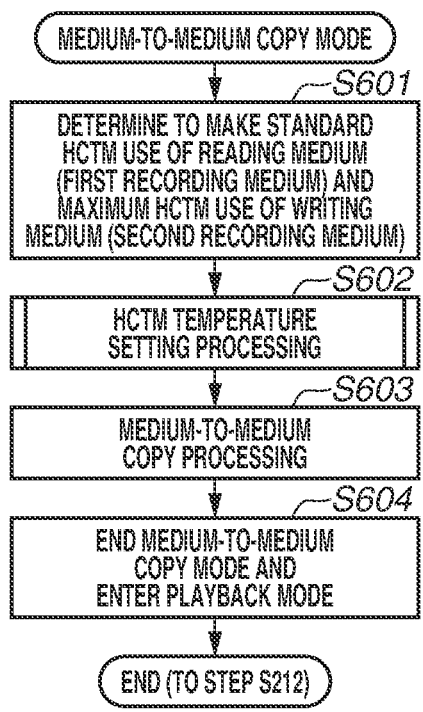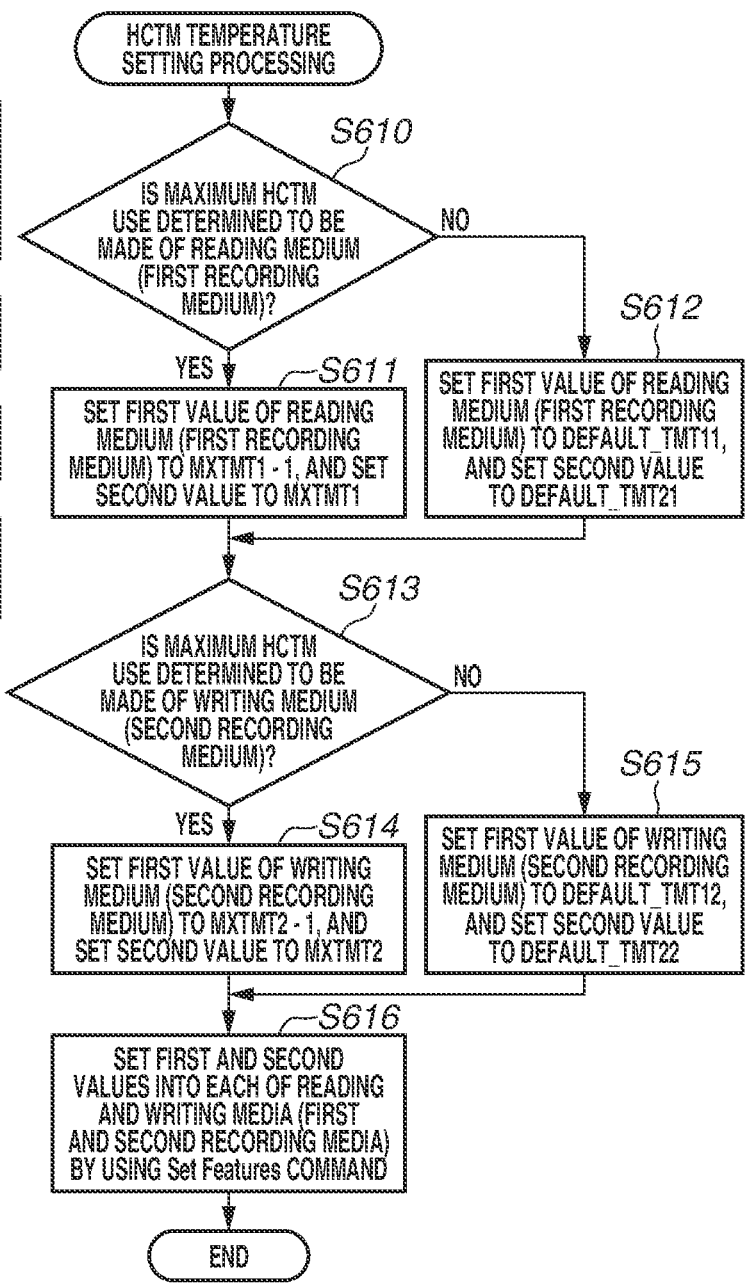

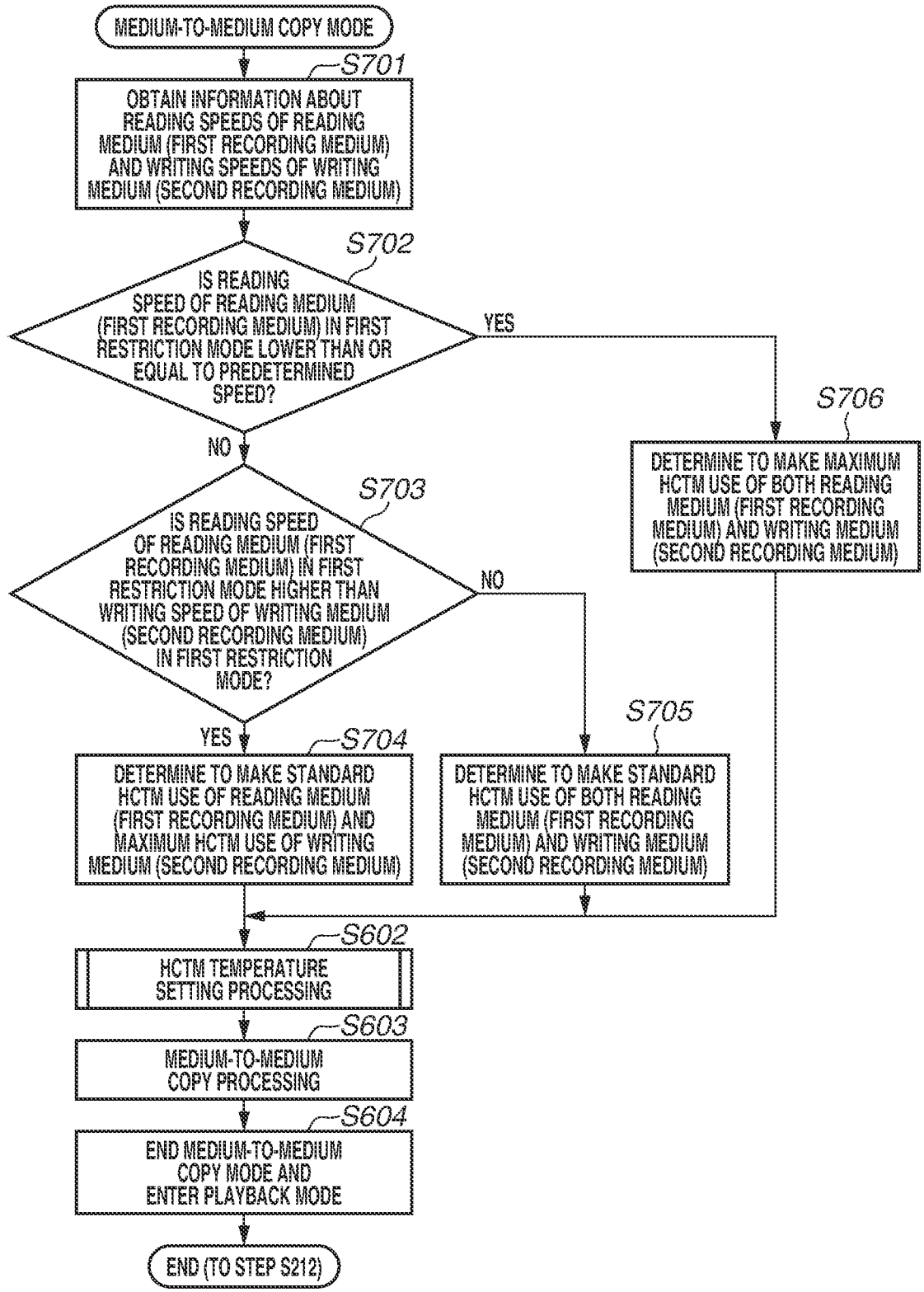

RECORDING CONTROL APPARATUS FOR ACCESSING A PLURALITY OF RECORDING MEDIA AND METHOD FOR CONTROLLING SAID RECORDING CONTROL APPARATUS

BACKGROUND

Field of the Disclosure

The present disclosure relates to a recording control apparatus that can access recording media, and a method for controlling the recording control apparatus.

Description of the Related Art

Flash memory cards are widely used as recording media for imaging apparatuses. While demand for performance in terms of writing and reading speeds to and from flash memory cards has been increasing in recent years, the same or even smaller physical memory sizes have also been demanded in the market. However, improving the performance of flash memory cards leads to higher power and heat or temperature. Further, miniaturization tends to result in heat accumulation.

The temperature increase can cause overheating beyond the guaranteed operating temperature of hardware components, possibly ending up with a breakdown or failure. As a result, contents recorded by a user can be no longer accessible because of medium breakdown.

To prevent the overheating due to temperature increase, Japanese Patent Application Laid-Open No. 2017-5323 discusses detection of ambient temperature and dynamic speed control based on the detected ambient temperature.

As a solution for preventing breakdowns and failures due to overheating, there is a technique called "thermal throttling". With this technique, a recording medium (flash memory card) stores its own temperature threshold inside. If a value obtained from the internal thermometer of the recording medium reaches a temperature higher than or equal to the temperature threshold, a function restriction such as an access speed restriction is imposed to suppress temperature increases beyond the threshold.

The use of such a technique can maintain the hardware components in the recording medium at the guaranteed operating temperature even in a severe environment. The reliability of the recorded contents can thereby be guaranteed, and the life of the recording medium can be extended.

The thermal throttling (suppression of temperature increase by a functional restriction) has a disadvantage in that the writing and reading speeds drop. This is ascribable to the characteristic of flash memory cards that the writing and reading speeds are proportional to an increase in heat and power. Moreover, once thermal throttling is performed, the writing and reading speeds are restricted until the temperature of the recording medium falls to or below a cancellation temperature. If the temperature of the recording medium falls to or below the cancellation threshold, the thermal throttling is cancelled, and the restriction on the writing and reading speeds is lifted to restore the normal writing and reading speeds intended for maximum speed.

A recording medium standard CompactFlash Express (CFexpress) provides a function called Host Controlled Thermal Management (HCTM) for the thermal throttling. With the HCTM function, the temperature threshold to perform the thermal throttling can be set by a host apparatus.

For example, in the Host Controlled Thermal Management (HCTM) function, thermal throttling can be controlled to occur less frequently by setting the temperature threshold to a maximum possible temperature setting.

However, if the temperature threshold is set to the maximum possible temperature setting by the HCTM function to make the thermal throttling less frequent, data is recorded or read at high speed even during data recording or reading that does not require the maximum speed. Accordingly, temperature increases easily. If the temperature of the recording medium increases and reaches the upper limit, the writing and reading to and from the recording medium are substantially inhibited, Since data is unable to be written or read until the temperature of the recording medium falls, imaging (recording), image reproduction, or data copying between a plurality of media is not available. As a result, an imaging opportunity can be missed, for example.

SUMMARY

The present disclosure is directed to providing a recording control apparatus that can appropriately set a temperature at which a functional restriction is imposed on a recording medium.

According to an aspect of the present disclosure, there is provided a recording control apparatus configured to access a plurality of recording media. The recording control apparatus includes a memory and at least one processor which function as: a control unit configured to set a temperature threshold of each of a first recording medium and a second recording medium, a functional restriction being imposed on the recording medium at the temperature threshold, wherein the control unit is configured to, in recording data read from the first recording medium into the second recording medium, make a first setting for the first recording medium and a second setting for the second recording medium, the first setting including setting the temperature threshold of the recording medium at which the functional restriction is imposed on the recording medium to a default value of the recording medium, the second setting including setting the temperature threshold of the recording medium at which the functional restriction is imposed on the recording medium to a value greater than the default value of the recording medium.

Further features of the present disclosure will become apparent from the following description of exemplary embodiments with reference to the attached drawings.

BRIEF DESCRIPTION OF THE DRAWINGS

FIGS. 6A and 6B are flowcharts illustrating processing in a medium-to-medium copy mode according to a second exemplary embodiment of the subject innovation.

FIG. 7 is a flowchart illustrating processing in a medium-to-medium copy mode according to a third exemplary embodiment of the subject innovation.

DESCRIPTION OF THE EMBODIMENTS

Figure 1:
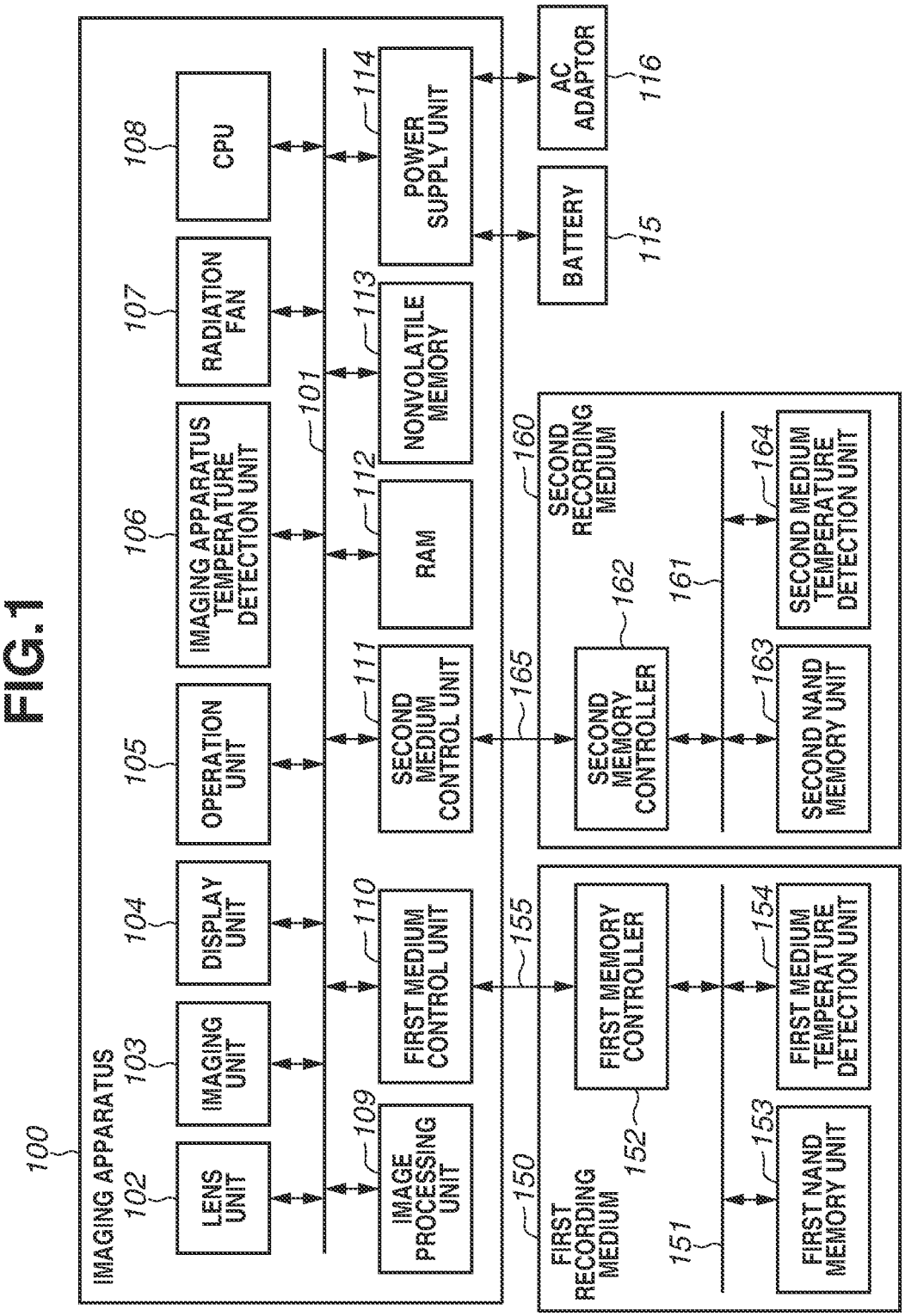
FIG. 1 is a diagram schematically illustrating a configuration of an imaging apparatus, according to one or more embodiment of the subject innovation.

Exemplary embodiments will be described in detail below with reference to the attached drawings. It should be noted that the following exemplary embodiments are not intended to limit the disclosure set forth in the claims. While the exemplary embodiments describe a plurality of features, all the plurality of features is not necessarily indispensable to the disclosure, and some of the features may be combined as appropriate. In the attached drawings, the same or similar components are denoted by the same reference numerals, and a redundant description thereof will be omitted.

<Configuration of imaging Apparatus>

FIG. 1 is a diagram schematically illustrating a configuration of an imaging apparatus 100 that is an example of a recording control apparatus according to a first exemplary embodiment.

In FIG. 1, a lens unit 102, an imaging unit 103, a display unit 104, an operation unit 105, an imaging apparatus temperature detection unit 106, a radiation fan 107, and a central processing unit (CPU) 108 are connected to an imaging apparatus internal bus 101. An image processing unit 109, a first medium control unit 110, a second medium control unit 111, a random access memory (RAM) 112, a nonvolatile memory 113, and a power supply unit 114 are also connected to the imaging apparatus internal bus 101. The components connected to the imaging apparatus internal bus 101 are configured to be capable of exchanging data with each other via the imaging apparatus internal bus 101.

The CPU 108 controls the components of the imaging apparatus 100 based on a program stored in the nonvolatile memory 113, for example, by using the RAM 112 as a work memory.

The nonvolatile memory 113 stores image data, audio data, other data, and various programs for operating the CPU 108. Examples of the nonvolatile memory 113 includes a hard disk (HI)) and a ROM.

The image processing unit 109 applies various types of image processing to image data that is stored in the nonvolatile memory 113 or the RAM 112 and image data that is obtained by the imaging unit 103 capturing an optical object image incident through the lens unit 102, based on control by the CPU 108, The image processing to be performed by the image processing unit 109 includes analog-to-digital (A/D) conversion processing, digital-to-analog (D/A) conversion processing, image data encoding processing, compression processing, decoding processing, enlargement/reduction processing (resize processing), noise reduction processing, and color conversion processing. The image processing unit 109 may include a dedicated circuit block for applying a specific type of image processing. Depending on the type of image processing, the CPU 108 may perform the image processing based on a program without using the image processing unit 109.

The display unit 104 displays images and a graphical user interface (GUI) screen constituting a GUI based on control by the CPU 108. The CPU 108 generates a display control signal based on a program, and controls the components of the imaging apparatus 100 so that a video signal to be displayed on the display unit 104 is generated and output to the display unit 104. The display unit 104 displays a video image based on the output video signal. The display unit 104 may be configured as an external monitor (such as a television set), and the imaging apparatus 100 may include an interface for outputting the video signal to be displayed on the display unit 104.

The operation unit 105 is an input device for accepting user operations, and includes a touch panel, a power button, a shutter button, a mode switch dial, a four-way operational key, an operation dial, and a menu button. The touch panel is an input device that is configured flat and stacked on the display unit 104, and is configured to output coordinate information based on a touched position.

The power supply unit 114 is a power supply selection circuit including power input terminals to which a battery 115 and an alternating-current (AC) adaptor 116 can be attached, a comparator, and load switches. The power supply unit 114 selects one of, the battery 115 and the AC adaptor 116 that has a higher voltage, or the AC adaptor 116 preferentially.

The power supply unit 114 also includes a battery interface for connecting the imaging apparatus 100 and the battery 115. The battery interface includes not only a power supply terminal and a ground terminal but also a communication terminal for communicating with a microcomputer (not illustrated) in the battery 115 and a temperature detection unit (not illustrated) for detecting temperature inside the battery 115. The power supply unit 114 further includes an AC adaptor interface for connecting the imaging apparatus 100 and the AC adaptor 116. The AC adaptor interface includes a power supply terminal, a ground terminal, and a detection unit for detecting the AC adaptor 116.

The power supply unit 114 can notify the CPU 108 of information about the battery 115 and the AC adaptor 116 via the imaging apparatus internal bus 101, In addition, the power supply unit 114 regulates the voltage from the selected power supply by using a not-illustrated direct-current-to-direct-current (DC/DC) converter or a series regulator, and supplies the resulting power to the components of the imaging apparatus 100. Moreover, the power supply unit 114 A/D-converts the voltages of the attached battery 115 and AC adaptor 116, and notifies the CPU 108 of the respective values.

The imaging unit 103 is an image sensor such as a charge-coupled device (CCD) sensor or a complementary metal-oxide-semiconductor (CMOS) sensor. The lens unit 102 is a lens unit including a zoom lens, a focus lens, a shutter, an aperture stop, a ranging unit, and an A/D converter.

The imaging unit 103 can capture a still age and a moving image. Image data on a captured image is transmitted to the image processing unit 109, given various types of processing, and recorded in a first recording medium 150 or a second recording medium 160 as a still image file or a moving image file.

The radiation fan 107 is a cooling fan. The imaging apparatus temperature detection unit 106 detects the temperature inside the imaging apparatus 100, and notifies the CPU 108 of the temperature. The CPU 108 controls the number of fan rotations of the radiation fan 107 based on the temperature and thereby adjusts the temperature inside the imaging apparatus 100.

The imaging apparatus 100 can access the first recording medium 150 via the first medium control unit 110 and a first medium interface 155. The imaging apparatus 100 can record data on a still image or moving image on which the image processing, the encoding processing, and the compression processing are performed by the image processing unit 109 into the first recording medium 150. The imaging apparatus 100 can also read data on a still image or moving image recorded in the first recording medium 150 via the first medium control unit 110 and the first medium interface 155. The imaging apparatus 100 displays a video image obtained by decoding the read data by the image processing unit 109 on the display unit 104.

The first recording medium 150 is a recording medium that can be attached to and detached from the imaging apparatus 100, in the present exemplary embodiment, the first recording medium 150 is a memory card compliant with the CompactFlash Express (CFexpress) standard.

The first medium control unit 110 can communicate a control command to a first memory controller 152 via the first medium interface 155. Examples of the control command include commands for obtaining vendor information, temperature information, and write cycle information, as well as commands for recording and reproducing data.

The first recording medium 150 includes the first memory controller 152, a first NAND memory unit 153, and a first medium temperature detection unit 154, These components are connected by a first recording medium internal bus 151.

The first memory controller 152 records data on a still image or moving image transferred from the first medium control unit 110 into the first NAND memory unit 153. Here, the first memory controller 152 controls writing to a cache area of the first NAND memory unit 153 and controls transfer of data to a main data area. The first memory controller 152 can also perform garbage collection to move and rearrange fragments of data in the first NAND memory unit 153 to provide free space.

The first memory controller 152 obtains temperature of the first NAND memory unit 153 detected by the first medium temperature detection unit 154. The first memory controller 152 controls the clock frequency, accessibility, and access speed of the first NAND memory unit 153 based on the obtained temperature.

The second recording medium 160 is connected to the imaging apparatus 100 via the second medium control unit 111 and a second medium interface 165, and has a similar configuration and functions to those of the first recording medium 150, A second memory controller 162, a second NAND memory unit 163, and a second medium temperature detection unit 164 correspond to the first memory controller 152, the first NAND memory unit 153, and the first medium temperature detection unit 154, respectively. The second memory controller 162, the second NAND memory unit 163, and the second medium temperature detection unit 164 are connected by a second recording medium internal bus 161.

If a still image capturing mode is selected by a user operation on the mode switch dial, the imaging apparatus 100 operates in the still image capturing mode. In the still image capturing mode, the CPU 108 captures a still image with the imaging unit 103 in response to an operation on the shutter button. The CPU 108 transmits image data on the captured still image to the image processing unit 109 and controls the image processing unit 109 to apply various types of processing. Then, the CPU 108 generates a still image file from the image-processed image data, and performs recording control to record the still image file in the first recording medium 150 or the second recording medium 160 via the first medium control unit 110 or the second medium control unit 111.

If a moving image capturing mode is selected by a user operation on the mode switch dial, the imaging apparatus 100 operates in the moving image capturing mode. In the moving image capturing mode, the CPU 108 starts to capture a moving image with the imaging unit 103 in response to an operation on the shutter button or a moving image capturing button. The CPU 108 captures the moving image until the shutter button or the moving image capturing button is operated again. The CPU 108 transmits image data on the captured moving image to the image processing unit 109 to apply various types of processing. Then, the CPU 108 generates a moving image file from the image-processed image data, and performs recording control to record the moving image file in the recording medium (150 or 160) via the medium control unit (110 or 111).

If a playback mode button is operated by a user operation, the imaging apparatus 100 enters a playback mode. In the playback mode, the CPU 108 performs playback control to read an image file (still image file or moving image file) recorded in the first recording medium 150 or the second recording medium 160 via the first medium control unit 110 or the second medium control unit 111 and display the image file on the display unit 104. In the playback mode, in the case of the still image file, the CPU 108 displays the image data in the still image file on the display unit 104. In the case of the moving image file, the CPU 108 initially reads a representative image or a frame image of the first frame of the moving image and displays the read image on the display unit 104. Then, the CPU 108 plays back the moving image to continuously reproduce and display a plurality of frame images in the moving image file in response to input of a moving image playback start instruction by the user.

<Host Controlled Thermal Management (HCTM) Function of Recording Media>

Some memory cards compliant with the CFexpress standard can use a function called HCTM. HCTM is an optional function and is therefore not supported by some recording media. As described above, the memory controller (152 or 162) of a recording medium (150 or 160) performs a functional restriction control to control the clock frequency, accessibility, and access speed based on the temperature detected by the medium temperature detection unit (154 or 164). With the HCTM function, a threshold temperature to perform the functional restriction control can be set into the recording medium (150 or 160) by the host-side medium control unit (110 or 111).

With the HCTM function, a first value and a second value (first value<second value) can be set as temperature threshold settings. If the temperature detected by the medium temperature detection unit (154 or 164) is lower than the first value, the memory controller (152 or 162) does not perform the functional restriction control. In such a case, the access speed is not limited, and current consumption is not limited, either. This increases a write inrush current in recording a 4K moving image. If the temperature detected by the medium temperature detection unit (154 or 164) is higher than or equal to the first value and lower than the second value, the memory controller (152 or 162) performs the functional restriction control, and the recording medium (150 or 160) operates in a first restriction mode where the current consumption and writing speed are limited. The restriction on the writing speed in the first restriction mode, though depending on the recording medium, is often such that a moving image up to 4K resolution can be written. If the temperature detected by the medium temperature detection unit (154 or 164) is higher than or equal to the second value, the memory controller (152 or 162) operates the recording medium (150 or 160) in a second restriction mode where functions are greatly restricted compared to the first restriction mode. In the second restriction mode, the power consumption and the writing speed are often restricted so severely that the recording medium (150 or 160) is substantially unable to be written or read. The second restriction mode can lower the temperature of the recording medium (150 or 160) by imposing the severe restrictions on the functions (substantially disabling write and read operations), In such a manner, the medium control units (110 and 111) of the imaging apparatus 100 that is the host apparatus can control the timing for the recording media (150 and 160) supporting the HCTM function to enter the first restriction mode and the second restriction mode by setting the first and second values.

Default values (DEFAULT_TMT1 and DEFAULT_TMT2) of the respective first and second values are set for each recording medium. A temperature setting upper limit value (MXTMT) and a temperature setting lower limit value (MNTMT) indicating a possible range of temperature settings are also set for each recording medium. The imaging apparatus 100 can obtain medium capability information including the temperature setting upper limit value (MXTMT) and the temperature setting lower limit value (MNTMT) set in each recording medium (150 or 160) by the medium control unit (110 or 111) of the imaging apparatus 100 using a command to obtain the medium capability information from the recording medium (150 or 160). The first value and the second value serving as the temperature thresholds to perform the first restriction mode and the second restriction mode can be set within the range of temperature settings indicated by the temperature setting upper limit value (MXTMT) and the temperature setting lower limit value (MNTMT).

If a recording medium (150 or 160) is powered on, the memory controller (152 or 162) of the recording medium (150 or 160) initializes the first and second values to the respective default values (DEFAULT_TMT1 and DEFAULT_TMT2). The default values are used if the first and second values are not set by the medium control unit (110 or 111) of the imaging apparatus 100. The use of the default values will be referred to as "standard HCTM use". The medium control unit (110 or 111) of the imaging apparatus 100 can change the first and second values within the range between the temperature setting lower limit value (MNTMT) and the temperature setting upper limit value (MXTMT) set in the recording medium (150 or 160) by using commands related to the HCTM function. The first and second values are stored in a volatile memory in the recording medium (150 or 160). Thus, the first and second values are erased when the recording medium (150 or 160) is powered off, and the default values are set when the recording medium (150 or 160) is powered on again. In contrast with the standard HCTM use, setting the first and second values to values close to the temperature setting upper limit value (MXTMT) will be referred to as "maximum HCTM use". In the present exemplary embodiment, in the maximum HCTM use, the second value is set to the temperature setting upper limit value (MXTMT), and the first value is set to a temperature 1° C. below the temperature setting upper limit value (MXTMT). However, the temperature settings of the first and second values in the maximum HCTM use are not limited thereto. To make the recording medium (150 or 160) less likely to enter the first and second restriction modes even at high temperatures, the first and second values can be set to values closer to the temperature setting upper limit value (MXTMT) than those in the standard HCTM use. Setting the first value in the maximum HCTM use above the second value in the standard HCTM use can make the first and second restriction modes in the maximum HCTM use less frequent to be invoked, whereby maximum use can be made of the performance of the recording medium (150 or 160). However, the temperature is more likely to increase in such a case.

In the present exemplary embodiment, the recording media 150 and 160 are described to be memory cards compliant with the CFexpress standard. However, the present exemplary embodiment is also applicable to recording media of other standards as long as the recording media have a function of setting a temperature to impose a functional restriction by a host apparatus, such as the HCTM function of the CFexpress standard.

<Processing Flow for Using HCTM Function>

Figure 2:
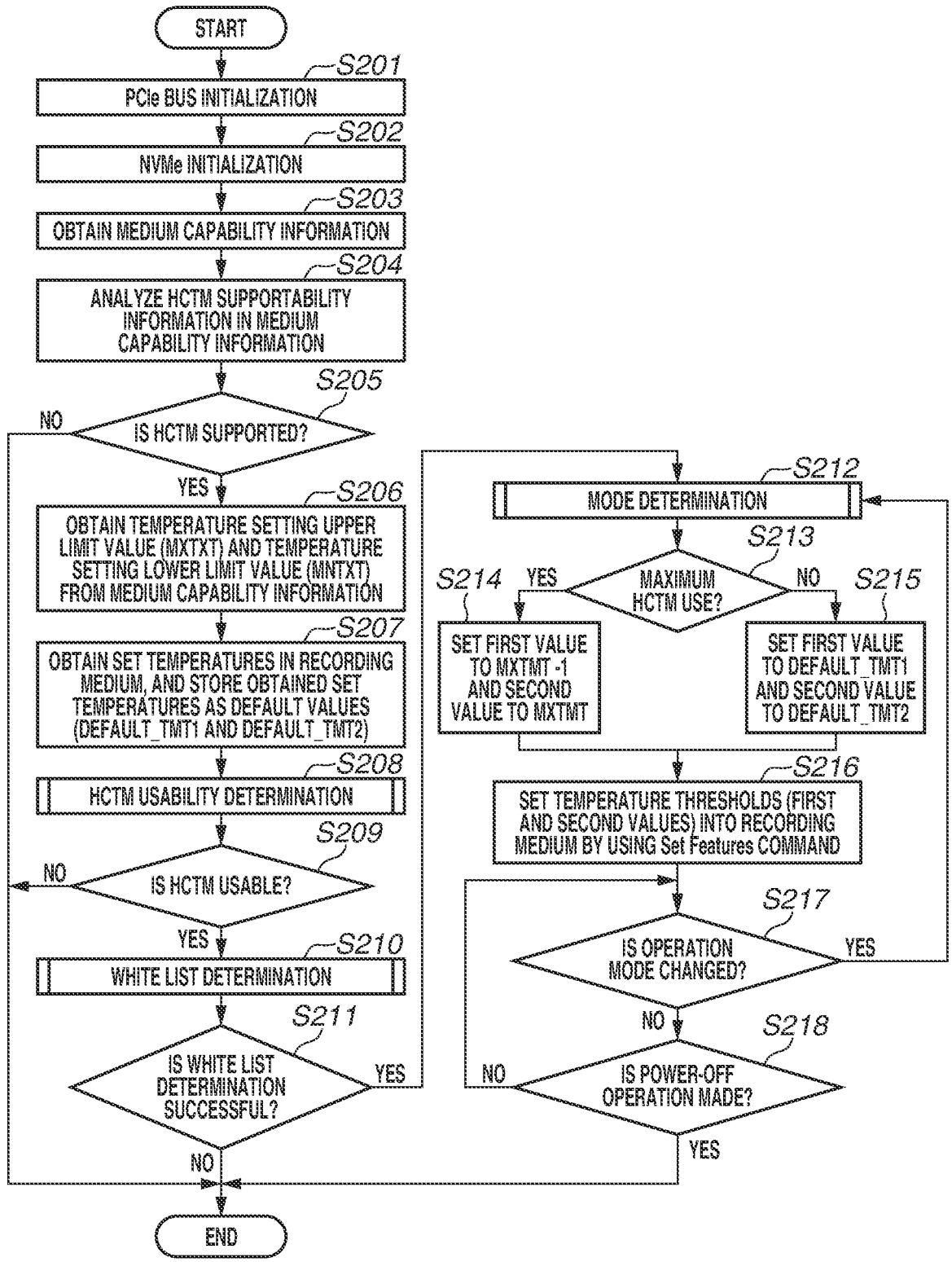
FIG. 2 is a flowchart illustrating processing for using a Host Controlled Temperature Management (HCTM) function performed by the imaging apparatus, according to one or more embodiment of the subject innovation.

FIG. 2 is a main flowchart of processing for using the HCTM function performed by the imaging apparatus 100. The flowchart is implemented by the CPU 108 executing a control program stored in the nonvolatile memory 113 and controlling the components of the imaging apparatus 100. While the flowchart mainly describes processing related to a recording medium, the CPU 108 also performs other processing such as imaging processing, image reproduction processing, processing for displaying a captured image and a menu screen, and menu setting processing. The description of the flowchart deals with processing on the first recording medium 150, whereas similar processing is also performed on the second recording medium 160.

The processing of the flowchart is performed when the power button is pressed to power on the imaging apparatus 100.

In step S201, the first medium control unit 110 performs Peripheral Component Interconnect Express (PCIe) bus initialization on the first recording medium 150. Here, the first medium control unit 110 of the imaging apparatus 100 that is the host apparatus and the first recording medium 150 exchange commands on a physical layer level, whereby activation processing of the first recording medium 150 is performed to power on the first recording medium 150. In step S202, the first medium control unit 110 performs initialization based on a Non-Volatile Memory Express (NVMe) protocol to perform activation processing including that of a submission queue and a completion queue, Unlike the initialization on the physical layer level in step S201, the initialization in step S202 is performed by the protocol on a software level.

In step S203, the first medium control unit 110 issues an Identify command to obtain detailed capabilities (medium capability information) of the first recording medium 150. The Identify command is one of the commands for obtaining basic information such as the commands and functions supported by a recording medium. Examples of the medium capability information obtainable by the command include a model name, firmware version, whether specific commands and functions are supported, the number of low power consumption modes, and specific values of power consumption. In step S204, the CPU 108 analyzes HCTM supportability information in the medium capability information about the first recording medium 150, obtained by using the Identify command in step S203. In step S205, the CPU 108 determines based on the analysis in step S204 whether the first recording medium 150 supports HCTM. If the first recording medium 150 is determined as supporting HCTM (YES in step S205), the processing proceeds to step S206 (control sequence for a recording medium using the HCTM function). If, in step S205, the first recording medium 150 is determined as not supporting HCTM (NO in step S205), the processing of the flowchart ends. Then, the CPU 108 performs processing for a recording medium not using the HCTM function.

In step S206, the CPU 108 obtains the current temperature setting upper limit value (MXTMT) and the current temperature setting lower limit value (MNTMT) of the first recording medium 150 from the medium capability information obtained in step S203, The temperature setting upper limit value (MXTMT) and the temperature setting lower limit value (MNTMT) are values that are valid only if HCTM is supported, and indicate the upper limit value and the lower limit value of the temperature values (first and second values) that can be set by the host apparatus. In other words, the CPU 108 here obtains the possible range of temperature setting values. The CPU 108 stores the temperature setting upper limit value (MXTMT) and the temperature setting lower limit value (MNTMT) obtained here in the RAM 112.

In step S207, the first medium control unit 110 issues a Get Features command that is a detailed function information acquisition command. The Get Features command is a command for obtaining information about the first recording medium 150, and can obtain information different from what is obtained by the Identify command. The Get Features command can obtain more detailed information than the Identify command does. The set temperatures (first and second values) currently set in the first recording medium 150 by the HCTM function can be obtained by using the Get Features command. The set temperatures obtained here are the default values set in the first recording medium 150 since the set temperatures are values obtained immediately after the power-on of the first recording medium 150 without changing the temperature settings. In other words, the default values of the temperature setting thresholds (first and second values) of the first recording medium 150 are obtained here. The CPU 108 stores the first value obtained here in the RAM 112 as DEFAULT_TMT1, and the second value obtained here in the RAM 112 as DEFAULT_TMT2.

In step S208, the CPU 108 makes an HCTM usability determination. A detailed description thereof will be given below with reference to FIG. 3, Since HCTM is not a mandatory function but an optional function, there can be recording media not supporting HCTM. As with a Suspend Address command in the Video Speed Class standard, the HCTM function is not beneficial to recording medium vendors, and thus some vendors may omit close inspection. For such reasons, in step S208, the CPU 108 checks for the validity of the temperature setting upper limit value and the temperature setting lower limit value obtained in step S206 and the HCTM default values obtained in step S207, and determines whether to use the HCTM function based on the check result. In step S209, if the determination of step S208 is that HCTM is usable (YES in step S209), the processing proceeds to step S210. If the determination of step S208 is that HCTM is not usable (NO in step S209), the processing of the flowchart ends. Then, the CPU 108 performs the processing for a recording medium not using the HCTM_function.

In step S210, the CPU 108 makes a white list determination. A detailed description thereof will be given with reference to FIG. 4. In step S211, if the white list determination in step S210 is successful (YES in step S211), the processing proceeds to step S212. If the white list determination in step S210 fails (NO in step S211), the processing of the flowchart ends. Then, the CPU 108 performs the processing for a recording medium not using the HCTM function.

In step S212, the CPU 108 makes a mode determination. A detailed description will be given with reference to FIG. 5. In the mode determination, the CPU 108 determines the current operation mode of the imaging apparatus 100, and determines whether to make "standard HCTM use" or "maximum HCTM use" based on the operation mode. As described above, in the case of the "standard. HCTM use", the default values obtained in step S207 are simply used. In the case of the "maximum HCTM use", values based on the temperature setting upper limit value obtained in step S206 are used. In such a manner, the temperatures at which the first recording medium 150 enters the first restriction mode and the second restriction mode are switched depending on the operation mode of the imaging apparatus 100. In an operation mode where high speed is not particularly necessary, an excessive increase in temperature is suppressed by the standard HCTM use with the default values. In an operation mode where high speed is necessary, the performance of the first recording medium 150 can continue to be exploited by the maximum HCTM use until the first recording medium 150 reaches a temperature higher than in the standard HCTM use.

In step S213, the CPU 108 determines whether the maximum HCTM use is determined to be made as a result of the mode determination in step S212. If the maximum HCTM use is determined to be made (YES in step S213), the processing proceeds to step S214, In step S214, the CPU 108 sets the second value of the HCTM temperatures settings of the first recording medium 151) to the temperature setting upper limit value MXTMT, and the first value as MXTMT−1, In the present exemplary embodiment, the first value is set to 1° C. below MXTMT, i.e., MXTMT−1, However, the first value in the maximum HCTM use may be other than MXTMT−1, The first value may be set to any other value greater than the default value DEFAULT_TMT1 depending on the operation condition and the curve of temperature increase.

In step S213, if not the maximum HCTM use but the standard HCTM use is determined to be made as a result of the mode determination in step S212 (NO in step S213), the processing proceeds to step S215. In step S215, the CPU 108 sets the HCTM temperature settings of the first recording medium 150 to the default values. Specifically, the CPU 108 sets the first value to DEFAULT_TMT1 and the second value to DEFAULT_TMT2, In the present exemplary embodiment, the default values of the first recording medium 150 are used in the standard HCTM use. However, any other index values may be employed instead of the default values, Even if the default values are not used, the first value in the standard HCTM use is to be smaller than the first value in the maximum HCTM use, and the second value in the standard HCTM use is to be smaller than the second value in the maximum HCTM use.

In step S216, the CPU 108 and the first medium control unit 110 perform processing for setting the temperature thresholds (first and second values) of the HCTM function determined in step S214 or S215 into the first recording medium 150 by using a detailed function setting command called a Set Features command. Specifically, the CPU 108 sets the first and second values determined in step S214 or S215 into arguments for setting the HCTM temperature thresholds in the Set Features command, and issues the Set Features command to the first recording medium 150. Setting the temperature thresholds in step S216 changes the temperature thresholds at which the first restriction mode and the second restriction mode of the first recording medium 150 are performed.

In step S217, the CPU 108 determines whether the operation mode of the imaging apparatus 100 is changed. If the operation mode is changed (YES in step S217), the processing proceeds to step S212. If the operation mode is not changed (NO in step S217), the processing proceeds to step S218, If the mode switch dial is operated by the user, the imaging apparatus 100 switches between the still image capturing mode and the moving image capturing mode. If the playback button is operated, the imaging apparatus 100 switches to the playback mode. If the menu button is operated, the imaging apparatus 100 displays a setting screen on the display unit 104 and switches to a setting mode for making various settings based on user operations. In the present exemplary embodiment, mode changes include not only switching to the still image capturing mode, the moving image capturing mode, the playback mode, and the setting mode, but also changing an operation state of the imaging apparatus 100. Examples include changing the image to be reproduced in the playback mode and performing a specific function such as an image data medium-to-medium copy function. Thus, in step S217, the operation mode is also determined to be changed if the operation state is changed. Then, the processing of steps S212 to S216 is performed in the changed mode.

In step S218, the CPU 108 determines whether a power-off operation is made. If a power-off operation is made (YES in step S218), the processing of the flowchart ends, and the CPU 108 performs processing for power-off. If no power-off operation is made (NO in step S218), the processing returns to step S217. In other words, the processing of steps S212 to S216 is repeated each time the operation mode is changed.

Figure 3:
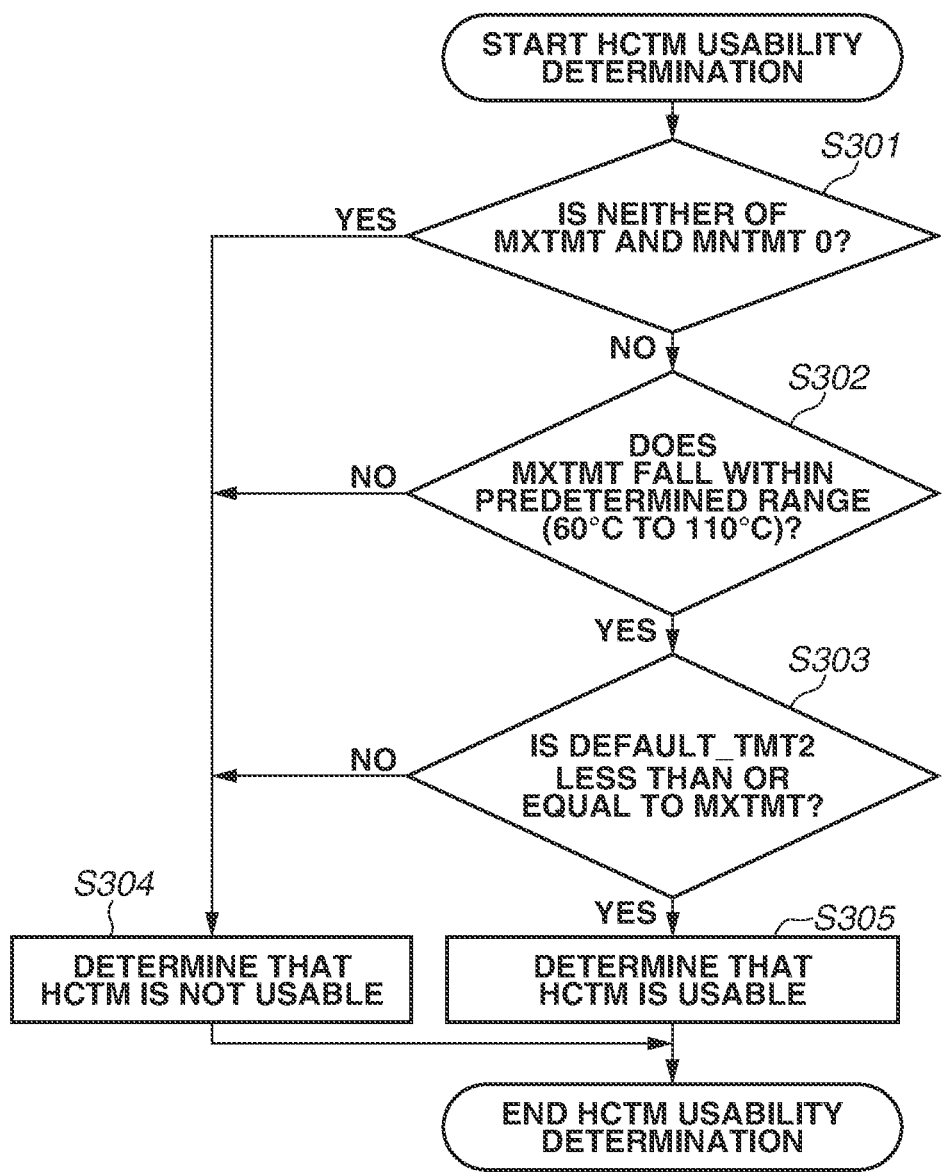
FIG. 3 is a flowchart illustrating HCTM usability determination processing, according to one or more embodiment of the subject innovation.

The procedure of the HCTM usability determination in step S208 of FIG. 2 will be described in detail with reference to FIG. 3.

First, in step S301, the CPU 108 determines whether neither of the temperature setting upper limit value (MXTMT) and the temperature setting lower limit value (MNTMT) obtained in step S206 is 0. If the temperature setting upper limit value or the temperature setting lower limit value is 0 despite the HCTM support, the value is not interpreted as being actually 0° C. but regarded as an initial value of 0 being left unchanged because no value has been set by the vendor. If neither of the temperature setting upper and lower limit values is 0 (NO in step S301), the processing proceeds to step S302. If either the temperature setting upper limit value or the temperature setting lower limit value is 0 (YES in step S301), the processing proceeds to step S304. In step S304, the CPU 108 determines that HCTM is not usable. In the present exemplary embodiment, HCTM is determined to be not usable if either the temperature setting upper limit value or the temperature setting lower limit value is 0. However, HCTM may be determined to be not usable only if both the temperature setting upper limit value and the temperature setting lower limit value are 0.

In step S302, to check the validity of the temperature setting upper limit value (MXTMT), the CPU 108 determines whether the temperature setting upper limit value (MXTMT) falls within a predetermined range. Specifically, if the temperature setting upper limit value (MXTMT) falls within the range of 60 to 110 (60° C. to 110° C.), the CPU 108 determines that the temperature setting upper limit value (MXTMT) is valid. In the present exemplary embodiment, the range of temperatures to be determined as valid is set to 60° C. to 110° C. in advance. However, the temperature range is not limited thereto. If the temperature setting upper limit value (MXTMT) falls within the temperature range of 60° C. to 110° C. (YES in step S302), the processing proceeds to step S303. If the temperature setting upper limit value (MXTMT) falls outside the range (NO in step S302), the processing proceeds to step S304. In step S304, the CPU 108 determines that HCTM is not usable.

In step S303, the CPU 108 compares DEFAULT_TMT2 corresponding to the second value of the default values obtained in step S207 with the temperature setting upper limit value (MXTMT) obtained in step S206. If DEFAULT_TMT2 set in the first recording medium 150 as the default value of the second value is greater than the temperature setting upper limit value MXTMT, either the value of DEFAULT_TMT2 set in the first recording medium 150 or the value of MXTMT is not appropriate. If DEFAULT_TMT2 is greater than the temperature setting upper limit value MXTMT (NO in step S303), the processing proceeds to step S304. In step S304, the CPU 108 determines that HCTM is not usable. If DEFAULT_TMT2 is less than or equal to the temperature setting upper limit value MXTMT (YES in step S303), the processing proceeds to step S305. In step S305, the CPU 108 determines that HCTM is usable.

As described above, in the present exemplary embodiment, whether HCTM is usable is determined by making checks in steps S301, S302, and S303, However, another determination may further be made. For example, the CPU 108 may compare the temperature setting upper limit value (MXTMT) with the temperature setting lower limit value (MNTMT), and if MXTMT is less than MNTMT, determine that HCTM is not usable.

Figure 4:
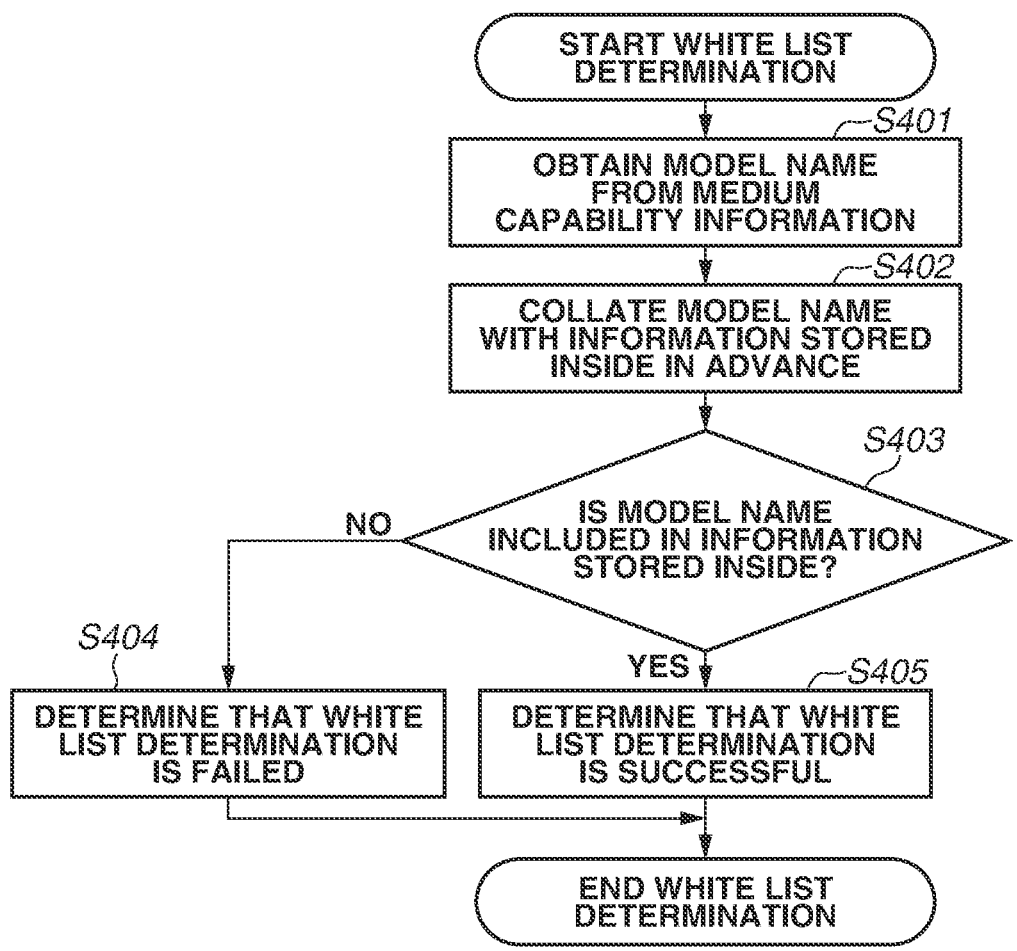
FIG. 4 is a flowchart illustrating white list determination processing, according to one or more embodiment of the subject innovation.

Next, the white list determination (white list determination processing) will be described with reference to FIG. 4. To implement the white list determination, information (white list) about reliable recording media is to be stored in the imaging apparatus 100 in advance. In the present exemplary embodiment, a model name will be described as a specific example of the stored information. However, this is not restrictive, and a vendor identifier (ID) obtained by PCIe physical layer communication may be used.

First, in step S401, the CPU 108 analyzes the medium capability information obtained in step S203 to obtain a model name. Next, in step S402, the CPU 108 collates the model name with the information stored inside in advance. In step S403, the CPU 108 determines whether the model name obtained in step S401 is included (has a match) in the information stored inside. If there is no match (NO in step S403), the processing proceeds to step S404. In step S404, the CPU 108 determines that the white list determination is failed. Then, the processing ends. If the model name is included in the information stored inside (YES in step S403), the processing proceeds to step S405. In step S405, the CPU 108 determines that the white list determination is successful. Then, the white list determination processing ends.

Figure 5:
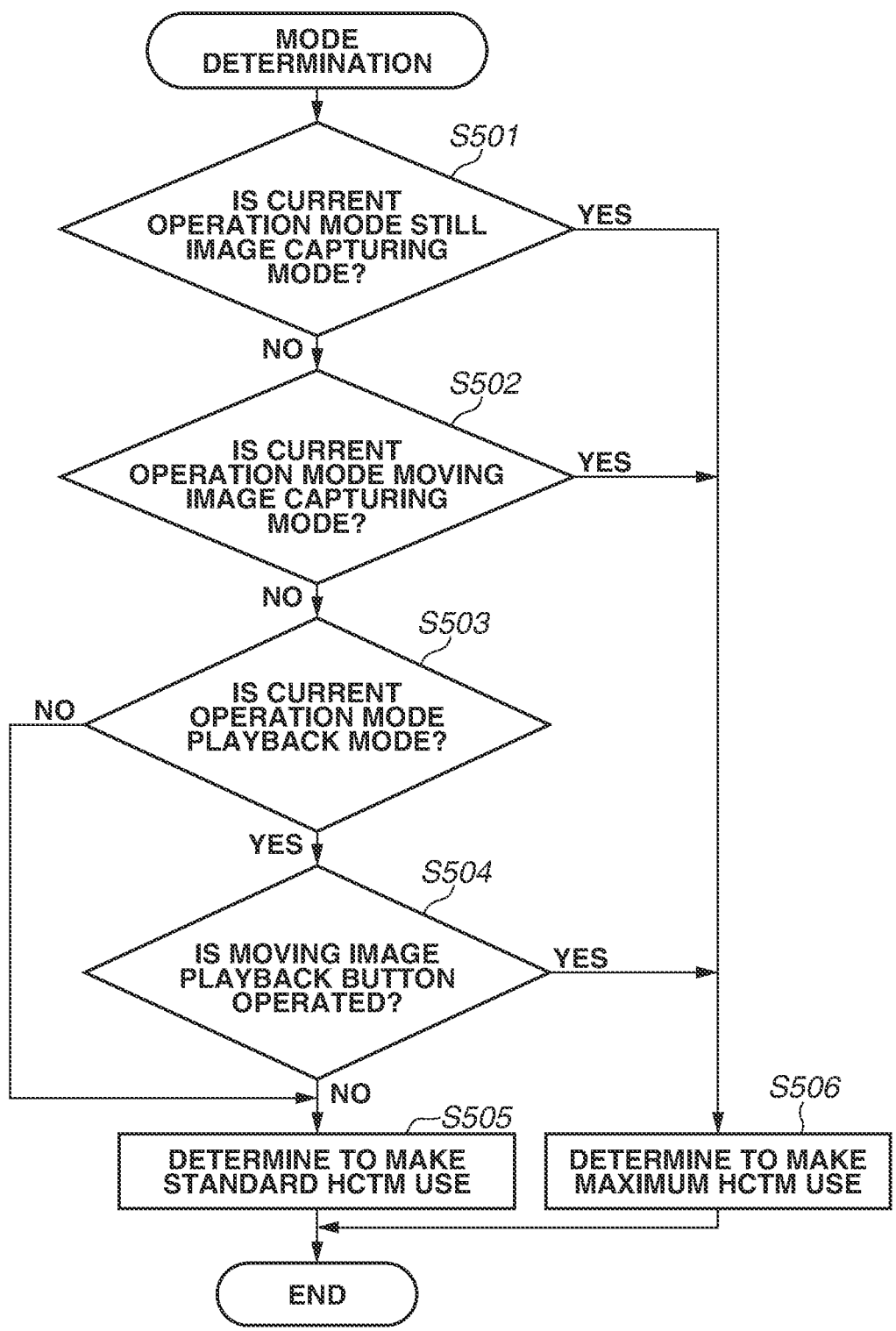
FIG. 5 is a flowchart illustrating mode determination processing, according to one or more embodiment of the subject innovation.

Next, the mode determination (mode determination processing) will be described in detail with reference to FIG. 5. First, in step S501, the CPU 108 determines whether the current operation mode of the imaging apparatus 100 is the still image capturing mode. If the current operation mode is determined to be the still image capturing mode (YES in step S501), the processing proceeds to step S506. If not (NC) in step S501), the processing proceeds to step S502 to make the next determination. In step S502, the CPU 108 determines whether the current operation mode of the imaging apparatus 100 is the moving image capturing mode. If the current operation mode is determined to be the moving image capturing mode (YES in step S502), the processing proceeds to step S506. If not (NO in step S502), the processing proceeds to step S503 to make the next determination. In step S503, the CPU 108 determines whether the current operation mode of the imaging apparatus 100 is the playback mode. If the current operation mode is determined to be the playback mode (YES in step S503), the processing proceeds to step S504. In step S504, the CPU 108 determines whether the mode change operation detected in step S217 is an operation on a moving image playback button for giving instructions to play back a moving image. If the moving image playback button is operated (YES in step S504), the processing proceeds to step S506. If the moving image playback button is not operated and the detected mode change operation is intended to enter the playback mode, reproduce a still image, or reproduce a frame image of a moving image file rather than to play back a moving image (NO in step S504), the processing proceeds to step S505. If the image to be reproduced in the playback mode is changed (switched), the processing also proceeds to step S505 to reproduce the next still image or a representative image (only the first frame image) of the next moving image. If, in step S503, the current operation mode is determined to not be the playback mode (NO in step S503), the processing proceeds to step S505. In step S505, the CPU 108 determines to make the standard HCTM use. In step S506, the CPU 108 determines to make the maximum HCTM use. In such a manner, in the present exemplary embodiment, whether to make the standard HCTM use or the maximum HCTM use is determined based on the operation mode and the operation state of the imaging apparatus 100.

In the present exemplary embodiment, the imaging apparatus 100 makes the maximum HCTM use when switching to the still image capturing mode, when switching to the moving image capturing mode, or when playing back a moving image in the playback mode. In other modes (in the setting mode and when reproducing a still image in the playback mode), the imaging apparatus 100 makes the standard HCTM use. In the still image capturing mode and the moving image capturing mode, the maximum HCTM use is determined to be made to exploit the maximum performance of the first recording medium 150 to not miss the imaging timing or opportunity intended by the user.

In playing back a moving image, the maximum HCTM use capable of exploiting the maximum performance of the first recording medium 150 is determined to be made despite some increase in temperature. The reason is that the reproduced moving image can stop in the event of underflow where the reading of the moving image is too slow compared to reproduction intervals.

In reproducing a still image or simultaneously reproducing a plurality of thumbnails in the playback mode, or in the setting mode, the imaging apparatus 100 makes the standard HCTM use. Moreover, even in playing back a moving image file in the playback mode, the imaging apparatus 100 makes the standard HCTM use as in reproducing a still image if only one frame image (only a representative image or selected frame) of the moving image file is reproduced. The imaging apparatus 100 also makes the standard HCTM use in performing functions such as a raw image development function, a recording medium initialization function, a function of copying image data between a plurality of media, and a moving image cropping and editing function. The reason is that without a specific restriction on time, exploiting the maximum performance of the recording medium is not particularly desirable. The raw image development function, the function of copying image data between media, and the moving image cropping and editing function can cause a temperature increase of 20° C. to 25° C. if performed on image data of large data size. Thus, the standard. HCTM use capable of suppressing temperature increases compared to the maximum HCTM use is made instead of the maximum HCTM use that is prone to temperature increases.

In the present exemplary embodiment, whether the imaging apparatus 100 is in the still image capturing mode, in the moving image capturing mode, or playing back a moving image is determined, and the maximum HCTM use is made in such cases. In the other cases, the standard HCTM use is made. However, this is not restrictive, and a modification may be made thereto. For example, distinction between the still image capturing mode and the moving image capturing mode may not be made, and the maximum HCTM use may be made in any image capturing mode. Moreover, in playing back a moving image, whether exploiting the maximum performance of the first recording medium 150 is desirable for the moving image may be determined based on a bitrate of the moving image. If the bitrate of the moving image is high, the maximum HCTM use is made. If the bitrate of the moving image is low, the standard. HCTM use is made.

Thus, in the present exemplary embodiment, in step S217, the CPU 108 monitors the operation mode and the operation state for a change related to switching between the standard HCTM use and the maximum HCTM use. If such a change occurs (YES in step S217), the CPU 108 determines whether to make the standard HCTM use or the maximum HCTM use in the mode determination processing (S212). Then, in step S216, the CPU 108 sets the first and second values to values corresponding to the standard or maximum HCTM use determined to be made, and changes the temperature thresholds of the HCTM function in the first recording medium 150. If the settings before and after the change are the same, the processing of step S216 may be omitted.

If the operation mode is changed, the settings of the temperature thresholds may be changed for the standard or maximum HCTM use before the processing in each operation mode (operation state) starts to be performed. Alternatively, the processing in each operation mode and the setting changes of the temperature thresholds may be performed in parallel. In the case of playing back a moving image, the settings of the temperature thresholds are desirably changed before the moving image playback processing is started.

In the first exemplary embodiment, whether to make the maximum HCTM use or the standard HCTM use of the recording medium to be processed is switched based on the still image capturing mode, the moving image capturing mode, the playback mode, and the processing mode of the imaging apparatus 100 in playing back a moving image. In a second exemplary embodiment, in copying data between two recording media, a different HCTM control is performed on each of the two recording media, Since an imaging apparatus according to the present exemplary embodiment has a basic configuration similar to that of the first exemplary embodiment, a description thereof will be omitted. As described in the first exemplary embodiment, the processing for using the HCTM function illustrated in FIG. 2 is performed on each of the first and second recording media 150 and 160, The temperature setting upper limit value and the temperature setting lower limit value of the first recording medium 150 obtained in step S206 will be denoted by MXTMT1 and MNTM1, respectively. The temperature setting upper limit value and the temperature setting lower limit value of the second recording medium 160 will be denoted by MXTMT2 and MNTMT2, respectively. With regard to the default values of the temperature settings obtained in step S207, the default values of the first and second values of the first recording medium 150 will be denoted by DEFAULT_TMT11 and DEFAULT_TMT21, respectively. The default values of the first and second values of the second recording medium 160 will be denoted by DEFAULT_TMT12 and DEFAULT_TMT22, respectively.

<HCTM Control in Medium-to-Medium Copy Mode>

FIGS. 6A and 6B are flowcharts of HCTM control processing in a medium-to-medium copy mode. The processing of the steps in the flowcharts is implemented by the CPU 108 executing a control program stored in the nonvolatile memory 113 and controlling the components of the imaging apparatus 100, In the following description, a medium-to-medium copy is performed with the first recording medium 150 as a reading medium and the second recording medium 160 as a writing medium. The relationship between the reading and writing media may be reversed so that the first recording medium 150 serves as a writing medium and the second recording medium 160 as a reading medium.

Medium-to-medium copy mode processing illustrated in the flowcharts is performed in response to selection of the medium-to-medium copy mode by the user on the imaging apparatus 100. The flowcharts of FIGS. 6A and 6B are performed after the medium-to-medium copy mode is determined to be selected. After the flowchart of FIG. 6A is performed and the medium-to-medium copy mode ends, the processing returns to step S212 of FIG. 2.

If the medium-to-medium copy mode is selected, then in step S601, the CPU 108 determines to make the standard HCTM use of the first recording medium 150 that is the reading medium, and to make the maximum HCTM use of the second recording medium 160 that is the writing medium. Then, in step S602, the CPU 108 performs HCTM temperature setting processing.

The HCTM temperature setting processing in the medium-to-medium copy mode will be described with reference to the flowchart of FIG. 6B.

First, in step S610, the CPU 108 determines whether the maximum HCTM use is determined to be made of the first recording medium 150 that is the reading medium. If the maximum HCTM use is determined to be made (YES in step S610), the processing proceeds to step S611. If the standard HCTM use is determined to be made (NO in step S610), the processing proceeds to step S612. In step S611, the CPU 108 sets the first value of the temperature settings of the first recording medium 150 that is the reading medium to the temperature setting upper limit value −1, i.e., MXTMT1−1. The CPU 108 sets the second value thereof to the temperature setting upper limit value MXTMT1, In step S612, the CPU 108 sets the first value of the temperature settings of the first recording medium 150 that is the reading medium to the default value DEFAULT_TMT11, and sets the second value thereof to the default value DEFAULT_TMT21. In step S613, the CPU 108 determines whether the maximum HCTM use is determined to be made of the second recording medium 160 that is the writing medium. If the maximum HCTM use is determined to be made (YES in step S613), the processing proceeds to step S614. If the standard HCTM use is determined to be made (NO in step S613), the processing proceeds to step S615. In step S614, the CPU 108 sets the first value of the temperature settings of the second recording medium 160 that is the writing medium to the temperature setting upper limit value −1, MXTMT2−1. The CPU 108 sets the second value to the temperature setting upper limit value MXTMT2. In step S615, the CPU 108 sets the first value of the temperature settings of the second recording medium 160 that is the writing medium to the default value DEFAULT_TMT12, and sets the second value to the default value DEFAULT_TMT22, in step S616, the CPU 108 notifies the first medium control unit 110 of the first and second values of the first recording medium 150 set by the processing so far, and the second medium control unit 111 of the first and second values of the second recording medium 160. The first medium control unit 110 and the second medium control unit 111 issue Set Features commands to set the first and second values notified by the CPU 108 into the first recording medium 150 and the second recording medium 160, respectively. In such a manner, the first and second values of the temperature settings are set into the first recording medium 150 and the second recording medium 160 of which the maximum HCTM use or the standard HCTM use is determined to be made. Then, the HCTM temperature setting processing ends. After the end of the HCTM temperature setting processing, the processing returns to the flowchart of FIG. 6A. In step S603, the CPU 108 performs medium-to-medium copy processing. In the medium-to-medium copy processing, the first medium control unit 110 reads data to be copied from the first recording medium 150 that is the reading medium. The second medium control unit 111 writes the read data to the second recording medium 160. After the medium-to-medium copy processing of the data to be copied is completed, then in step S604, the CPU 108 ends the medium-to-medium copy mode and enters the playback mode. Then, the processing of the flowchart ends, and the processing proceeds to step S212 in the flowchart of FIG. 2. In other words, the CPU 108 makes HCTM temperature settings corresponding to the playback mode. As described above, in the present exemplary embodiment, in addition to the first exemplary embodiment, the HCTM temperature settings are changed between the reading medium and the writing medium in the medium-to-medium copy mode.

If the standard HCTM use is determined to be made of both the reading and writing media during a medium-to-medium copy, the heat generation of the media can be suppressed. However, this makes the media more likely to enter the first restriction mode. In the first restriction mode, the access speed drops and the medium-to-medium copy takes a long time to be completed. If the maximum HCTM use is determined to be made of both the media to reduce the copy time, the temperature increases of the media are difficult to suppress, and the media can sometimes enter the second restriction mode.

In the present exemplary embodiment, the standard HCTM use is made of either of the recording media and the maximum HCTM use is made of the other thereof to use respective different HCTM temperature setting methods. This can suppress the temperature increases and reduce the copy time in a well-balanced manner.

The reading speed in reading data from a recording medium is higher than the writing speed in writing data to the recording medium. Thus, in the present exemplary, embodiment, the standard HCTM use is made of the reading medium and the maximum HCTM use is made of the writing medium. This can further suppress transitions to the restriction modes while suppressing temperature increases and reducing the copy time.

In the second exemplary embodiment, in the medium-to-medium copy mode, the temperature settings for the standard HCTM use are described to be made to the reading medium, and the temperature settings for the maximum HCTM use are described to be made to the writing medium. In a third exemplary embodiment, the HCTM temperature settings are made by also taking into account the access speeds (reading and writing speeds) of the respective media. The processing in the medium-to-medium copy mode according to the present exemplary embodiment will be described with reference to the flowchart of FIG. 7. The flowchart is implemented by the CPU 108 executing a control program stored in the nonvolatile memory 113 and controlling the components of the imaging apparatus 100. Similar to the second exemplary embodiment, the processing of the flowchart is started in response to the selection of the medium-to-medium copy mode on the imaging apparatus 100. In the present exemplary embodiment, similar to the second exemplary embodiment, the first recording medium 150 will be described to be a reading medium, and the second recording medium 160 will be described to be a writing medium. However, the relationship between the reading and writing media may be reversed.

First, in step S701, the CPU 108 obtains information about the reading speeds of the first recording medium 150 that is the reading medium at normal time and in the first restriction mode (during thermal throttling) by communication between the first medium control unit 110 and the first memory controller 152. The CPU 108 further obtains information about the writing speeds of the second recording medium 160 that is the writing medium at normal time and in the first restriction mode (during thermal throttling) by communication between the second medium control unit 111 and the second memory controller 162. The information about the access speeds such as the reading speeds and the writing speeds are not necessarily obtained from the memory controllers 152 and 162, and may be obtained by referring to an internal table of the host apparatus (imaging apparatus 100) or in a mode where the host apparatus investigates the speeds.

Next, in step S702, the CPU 108 determines whether the reading speed of the first recording medium 150 that is the reading medium in the first restriction mode, obtained in step S701, is lower than or equal to a predetermined speed.

If the reading speed of the first recording medium 150 in the first restriction mode is lower than or equal to the predetermined speed (YES in step in step S702), it takes a long time to read and copy data if the first restriction mode is performed, Thus, the processing proceeds to step S706 to enable data to be read at normal reading speed without the reading medium entering the first restriction mode. In step S706, the CPU 108 determines to make the maximum HCTM use of both the first recording medium 150 that is the reading medium and the second recording medium 160 that is the writing medium. Since the first recording medium 150 that is the reading medium is set up for the maximum HCTM use and the temperature threshold (first value) to enter the first restriction mode is set to a value higher than that in the standard HCTM use, the reading medium is less likely to enter the first restriction mode. Then, the processing proceeds to step S602.

In step S702, if the reading speed of the first recording medium 150 that is the reading medium in the first restriction mode is not lower than or equal to the predetermined speed but is determined to be sufficient to perform a medium-to-medium copy even in the first restriction mode (NO in step S702), the processing proceeds to step S703.

In step S703, the CPU 108 compares the reading speed of the first recording medium 150 that is the reading medium in the first restriction mode, obtained in step S701, with the writing speed of the second recording medium 160 that is the writing medium in the first restriction mode.

If the reading speed of the reading medium in the first restriction mode is higher than the writing speed of the writing medium in the first restriction mode (YES in step S703), the processing proceeds to step S704. Typically, the reading speed in the first restriction mode is higher than the writing speed in the first restriction mode. Thus, the determination in step S703 is YES, and the processing proceeds to step S704. In step S704, similar to the second exemplary embodiment, the CPU 108 determines to make the standard HCTM use of the first recording medium 150 that is the reading medium and the maximum HCTM use of the second recording medium 160 that is the writing medium. Then, the processing proceeds to step S602.

In step S703, if the reading speed of the first recording medium 150 in the first restriction mode is determined to be lower than or equal to the writing speed of the second recording medium 160 in the first restriction mode (NO in step in step S703), the processing proceeds to step S705. Here, the reading speed of the first recording medium 150 is determined in step S702 to be sufficient to perform a medium-to-medium copy even with thermal throttling, and the writing speed of the second recording medium 160 in the first restriction mode is even higher than or equal to the reading speed. In other words, the first recording medium 150 and the second recording medium 160 have sufficient reading and writing speeds to perform the medium-to-medium copy processing even if both the first recording medium 150 and the second recording medium 160 are in the first restriction mode. Thus, in step S705, the CPU 108 determines to make the standard HCTM use of both the first recording medium 150 that is the reading medium and the second recording medium 160 that is the writing medium. Since the reading and writing speeds are sufficient to perform the medium-to-medium copy processing even in the first restriction mode, making the standard. HCTM use can suppress a temperature increase. Then, the processing proceeds to step S602. The processing of steps S602 to S604 is similar to that of the second exemplary embodiment. Thus, a detailed description thereof will be omitted. In step S602, the CPU 108 sets the temperature setting thresholds of the respective first and second recording media 150 and 160 based on the determination on whether to make the standard HCTM use or the maximum HCTM use. In step S603, the CPU 108 performs the medium-to-medium copy processing. After the completion of the medium-to-medium copy processing, in step S604, the CPU 108 enters the playback mode. Then, the processing returns to step S212.

As described above, in the present exemplary embodiment, whether to make the standard HCTM use or the maximum HCTM use of each medium is switched based on the reading speed of the reading medium and the writing speed of the writing medium.

The access speeds of an average recording medium are such that (the writing speed in the first restriction mode)< (the reading speed in the first restriction mode)<(the writing speed at normal time)<(the reading speed at normal time). Basically (with average recording media), the reading medium is set up for the standard HCTM use and the writing medium is set up for the maximum HCTM use as in the second exemplary embodiment. However, if the reading speed of the reading medium in the first restriction mode is low, the copy time in the first restriction mode increases. In such a case, both the reading and writing media are set up for the maximum HCTM use to make the first restriction mode less likely to occur. By contrast, if the reading speed of the reading medium in the first restriction mode is sufficient to perform the medium-to-medium copy processing and the writing speed of the writing medium is higher than the reading speed of the reading medium, the medium-to-medium copy processing can be performed in a short time even in the first restriction mode. Thus, both the reading and writing media are set up for the standard HCTM use to suppress temperature increases of the recording media.

In the present exemplary embodiment, if, in step S702, the reading speed of the reading medium is determined to not be low, then in step S703, the CPU 108 compares the reading speed of the reading medium with the writing speed of the writing medium. However, the CPU 108 may make the determination of step S703 without the determination of step S702, and then determine the HCTM temperature thresholds in step S704 or S705 accordingly.

Figure 8:
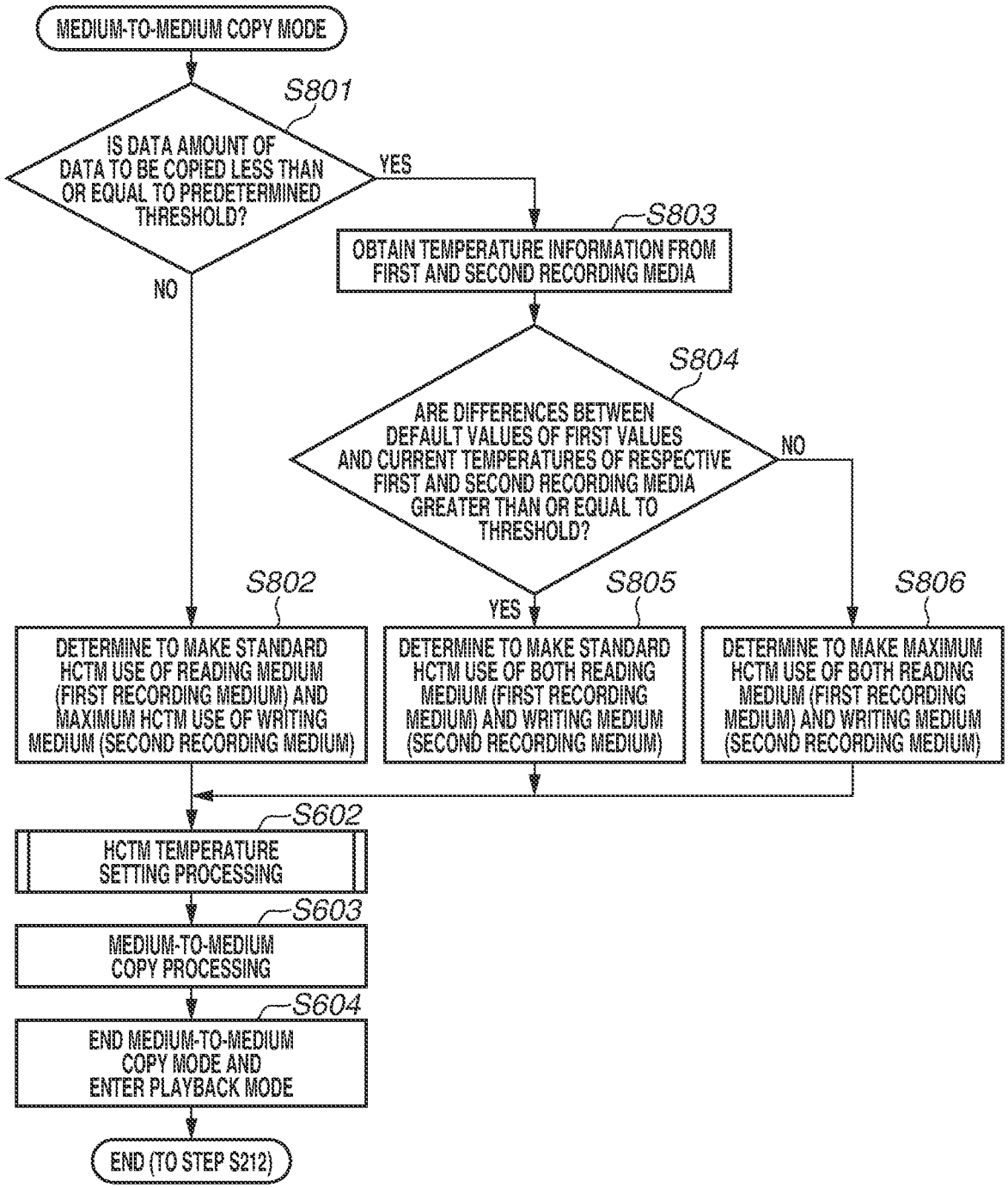
FIG. 8 is a flowchart illustrating processing in a medium-to-medium copy mode according to a fourth exemplary embodiment of the subject innovation.

In the third exemplary embodiment, the HUM temperature settings are made by taking into account the access speeds (reading and writing speeds) of the respective media. In a fourth exemplary embodiment, the HCTM temperature settings are made based on a data amount of data to be copied and temperatures of the recording media. The processing in the medium-to-medium copy mode according to the present exemplary embodiment will be described with reference to the flowchart of FIG. 8. The flowchart is implemented by the CPU 108 executing a control program stored in the nonvolatile memory 113 and controlling the components of the imaging apparatus 100, In step S801, the CPU 108 determines whether the data size (data amount) of the data to be copied is less than or equal to a predetermined threshold (predetermined data amount).

In step S801, if the data amount of the data to be copied is determined to be greater than, not less than or equal to, the predetermined threshold (NO in step S801), the processing proceeds to step S802. In step S802, similar to the second exemplary embodiment, the CPU 108 determines to make the standard HCTM use of the first recording medium 150 that is the reading medium and the maximum HCTM use of the second recording medium 160 that is the writing medium. Then, the processing proceeds to step S602.

In step S801, if the data amount of the data to be copied is determined to be less than or equal to the predetermined threshold (YES in step S801), the processing proceeds to step S803. In step S803, the CPU 108 obtains temperature information indicating the current temperatures inside the first and second recording media 150 and 160 from the respective recording media. The CPU 108 obtains the temperature information about the first recording medium 150 by communication between the first medium control unit 110 and the first memory controller 152. The CPU 108 obtains the temperature information about the second recording medium 160 by communication between the second medium control unit 111 and the second memory controller 162. The obtained temperature of the first recording medium 150 will be denoted by TMT1, and that of the second recording medium 160 will be denoted by TMT2. Then, the processing proceeds to step S804.

In step S804, the CPU 108 calculates, for each of the first and second recording medium 150 and 160, a difference between the default value of the first value of the temperature setting thresholds and the current temperature of the recording medium, and determines whether the calculated difference is greater than or equal to a threshold, Specifically, the CPU 108 calculates a difference for the first recording medium 150, DEFAULT_TMT11−TMT1, and a difference for the second recording medium 160, DEFAULT_TMT12−TMT2, and determines whether both the differences are greater than or equal to a predetermined threshold. In step S804, if the calculated differences of both the recording media 150 and 160 are greater than or equal to the threshold (YES in step S804), the processing proceeds to step S805, if either or both of the differences are less than the threshold (NO in step S804), the processing proceeds to step S806. The differences represent temperature differences beyond which the first restriction mode is performed. The greater the differences, the less likely the first restriction mode is to be performed.

In step S805, the CPU 108 chooses to make the standard HCTM use of both the first recording medium 150 that is the reading medium and the second recording medium 160 that is the writing medium. In such a case, both the first and second recording media 150 and 160 are less likely to enter the first restriction mode since, as determined in step S804, there is a wide temperature margin before the first restriction mode is performed. Thus, both the recording media 150 and 160 are set up for the standard HCTM use to suppress temperature increases of the recording media 150 and 160. Moreover, since the data amount of the data to be copied is small as determined in step S801, the medium-to-medium copy processing is likely to be completed before the recording media 150 and 160 enter the first restriction mode even if both the recording media 150 and 160 are set up for the standard HCTM use.

In step S806, the CPU 108 chooses to make the maximum HCTM use of both the first recording medium 150 that is the reading medium and the second recording medium 160 that is the writing medium. In such a case, the first recording medium 150 or the second recording medium 160 is likely to enter the first restriction mode since, as determined in step S804, the temperature to enter the first restriction mode is close to the current temperature. Entering the first restriction mode increases the copy time despite the small data amount. Thus, in step S806, the CPU 108 chooses to make the maximum HCTM use of both the recording media 150 and 160, so that the first restriction mode is less likely to be performed.

The processing of steps S602 to S604 is similar to that of the second exemplary embodiment, Thus, a detailed description thereof will be omitted. In step S602, the CPU 108 sets the temperature setting thresholds of the respective first and second recording media 150 and 160 based on the determination on whether to make the standard HCTM use or the maximum HCTM use. In step S603, the CPU 108 performs the medium-to-medium copy processing. After the completion of the medium-to-medium copy processing, in step S604, the CPU 108 enters the playback mode. Then, the processing returns to step S212.

In the present exemplary embodiment, the CPU 108 determines in step S301 whether the data amount of the data to be copied is less than or equal to the threshold, and then determines in steps S803 and S804 whether there are sufficient differences between the first values of the default values and the current temperatures of the recording media 150 and 160.

However, the CPU 108 may make the determination of steps S803 and S804 without the determination of step S801, and then determine the HCTM temperature thresholds in step S805 or S806 accordingly.

Alternatively, the CPU 108 may make only the determination of step S801 without the determination of steps S803 and S804. In such a case, if, in step S801, the data amount is determined to be less than or equal to a predetermined data amount (threshold), the processing may proceed to step S806. In step S806, the CPU 108 chooses to make the maximum HCTM use of both the reading and writing media.

Other Embodiments

While the exemplary embodiments of the present disclosure have been described in detail above, the present disclosure is not limited to these specific exemplary embodiments, and various exemplary embodiments within the scope not departing from the gist of the present disclosure are also included in the present disclosure, Some of the foregoing exemplary embodiments may be combined as appropriate.

In the foregoing exemplary embodiments, both the first and second recording media 150 and 160 are described to be memory cards compliant with the CFexpress standard. However, the exemplary embodiments are also applicable to a data copy between a medium complaint with the CFexpress standard and one compliant with another standard or a data copy between media complaint with other standards as long as the HCTM function or a function similar to the HCTM function is usable.

In the foregoing exemplary embodiments (third and fourth exemplary embodiments), the thresholds of the HCTM temperature settings are automatically switched based on the access speeds of the recording media in the first restriction mode, the data amount of the data to be copied, and/or differences between the temperature thresholds in the first restriction mode and the current temperatures. However, the thresholds may be switched based on selection by the user. For example, if speed priority is selected to give priority to the copy speed, both the recording media to be read and to be written may be set up for the maximum HCTM use. In a normal mode, the thresholds may be set as in the second exemplary embodiment.

In the foregoing exemplary embodiments (second, third, and fourth exemplary embodiments), the imaging apparatus 100 is described to enter the playback mode after the medium-to-medium copy processing ends, and make HCTM temperature settings corresponding to the playback mode by the processing of the flowchart in FIG. 2. However, the first and second recording media 150 and 160 may be set up for the standard HCTM use regardless of the mode of the imaging apparatus 100 immediately after the completion of the medium-to-medium copy processing. The standard HCTM use can suppress further temperature increases of the recording media 150 and 160 of which the temperatures have been increased by the medium-to-medium copy processing.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or mote circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-038003, filed Mar. 5, 2020, which is hereby incorporated by reference herein in its entirety.

What is claimed is:

1. A recording control apparatus configured to access a plurality of recording media, the recording control apparatus comprising:
a memory and at least one processor which function as:
a control unit configured to set a temperature threshold of each of a first recording medium and a second recording medium, a functional restriction being imposed on the first recording medium and second recording medium at the respective temperature thresholds,
wherein the control unit is configured to, in recording data read from the first recording medium into the second recording medium, make a first setting for the first recording medium and a second setting for the second recording medium, the first setting including setting the temperature threshold of the recording medium at which the functional restriction is imposed on the recording medium to a default value of the recording medium, the second setting including setting the temperature threshold of the recording medium at which the functional restriction is imposed on the recording medium to a value greater than the default value of the recording medium.

2. The recording control apparatus according to claim 1, further comprising an obtaining unit configured to obtain a reading or writing speed of a recording medium under the functional restriction,
wherein the control unit is configured to, in a case where a reading speed of the first recording medium under the functional restriction is lower than a writing speed of the second recording medium under the functional restriction, make the first setting for the first and second recording media.

3. The recording control apparatus according to claim 1, further comprising an obtaining unit configured to obtain a reading or writing speed of a recording medium under the functional restriction,
wherein the control unit is configured to, in a case where the reading speed of the first recording medium under the functional restriction is lower than or equal to a predetermined speed, make the second setting for the first and second recording media.

4. The recording control apparatus according to claim 3, wherein, if the reading speed of the first recording medium is under the functional restriction, the control unit is configured to,
in a case where the reading speed of the first recording medium under the functional restriction is lower than a writing speed of the second recording medium under the functional restriction, make the first setting for the first and second recording media, and
in a case where the reading speed of the first recording medium under the functional restriction is higher than the writing speed of the second recording medium under the functional restriction, make the first setting for the first recording medium and the second setting for the second recording medium.

5. The recording control apparatus according to claim 1, wherein the control unit is configured to, in a case where a data amount of the data read from the first recording medium and recorded into the second recording medium is less than a predetermined amount, make the second setting for the first and second recording media.

6. The recording control apparatus according to claim 1, wherein the control unit is configured to, in a case where a difference between a temperature of the first recording medium and the temperature threshold at which the functional restriction is imposed on the first recording medium is greater than or equal to a predetermined threshold and a difference between a temperature of the second recording medium and the temperature threshold at which the functional restriction is imposed on the second recording medium is greater than or equal to the predetermined threshold, make the first setting for the first and second recording media.

7. The recording control apparatus according to claim 6, wherein the control unit is configured to, in a case where the difference between the temperature of the first recording medium and the temperature threshold at which the functional restriction is imposed on the first recording medium is not greater than or equal to the predetermined threshold or the difference between the temperature of the second recording medium and the temperature threshold at which the functional restriction is imposed on the second recording medium is not greater than or equal to the predetermined threshold, make the second setting for the first and second recording media.

8. The recording control apparatus according to claim 1, wherein the control unit is configured to,
in a case where a data amount of the data to be read from the first recording medium and recorded into the second recording medium is greater than a predetermined amount, make the first setting for the first recording medium and the second setting for the second recording medium, and
in a case where the data amount of the data to be read from the first recording medium and recorded into the second recording medium is less than the predetermined amount, a difference between a temperature of the first recording medium and the temperature threshold at which the functional restriction is imposed on the first recording medium is greater than or equal to a predetermined threshold, and a difference between a temperature of the second recording medium and the temperature threshold at which the functional restriction is imposed on the second recording medium is greater than or equal to the predetermined threshold, make the first setting for the first and second recording media.

9. The recording control apparatus according to claim 8, wherein the control unit is configured to, in a case where the difference between the temperature of the first recording medium and the temperature threshold at which the functional restriction is imposed on the first recording medium is not greater than or equal to the predetermined threshold or the difference between the temperature of the second recording medium and the temperature threshold at which the functional restriction is imposed on the second recording medium is not greater than or equal to the predetermined threshold, make the second setting for the first and second recording media.

10. The recording control apparatus according to claim 1, wherein the control unit is configured to set a first value and a second value of each of the first and second media, the first value being a temperature threshold at which a first restriction mode is performed on the recording medium, the second value being a temperature threshold at which a second restriction mode is performed on the recording medium and being greater than the first value, a more severe restriction being imposed in the second restriction mode than in the first restriction mode.

11. The recording control apparatus according to claim 10, further comprising a range obtaining unit configured to obtain a range of values settable as a temperature threshold at which a functional restriction is imposed from a recording medium,
wherein the control unit is configured to set the first and second values within the range of values settable as the temperature threshold obtained by the range obtaining unit.

12. The recording control apparatus according to claim 11, wherein the control unit is configured to, in making the second setting, set an upper limit value in the range of values settable as the temperature threshold to the second value and set a value smaller than the second value and greater than the second value in making the first setting to the first value.

13. The recording control apparatus according to claim 12, wherein the control unit is configured to, in making the second setting, set a value 1 smaller than the upper limit value in the range of values settable as the temperature threshold.

14. The recording control apparatus according to claim 1, further comprising a default value obtaining unit configured to obtain a default value of the temperature threshold at which the functional restriction is imposed on the recording medium from the recording medium,
wherein the default value obtaining unit is configured to obtain the temperature threshold at which the functional restriction is imposed on the recording medium, the temperature threshold being set for the recording medium before a setting of the temperature threshold is changed, and use the obtained temperature threshold as the default value.

15. The recording control apparatus according to claim 1, wherein the first and second recording media are memory cards supporting a CompactFlash Express (CFexpress) standard, and
wherein the control unit is configured to set the temperature threshold by using a Host Controlled Thermal Management (HCTM) function.

16. A method for controlling a recording control apparatus configured to access a plurality of recording media, the method comprising:
setting a temperature threshold of each of a first recording medium and a second recording medium, a functional restriction being imposed on the recording medium at the temperature threshold,
wherein, in recording data read from the first recording medium in the second recording medium, a first setting is made for the first recording medium and a second setting is made for the second recording medium, the first setting including setting the temperature threshold of the recording medium at which the functional restriction is imposed on the recording medium to a default value of the recording medium, the second setting including setting the temperature threshold of the recording medium at which the functional restriction is imposed on the recording medium to a value greater than the default value of the recording medium.

17. A non-transitory computer-readable storage medium storing a program for causing a computer to perform the method for controlling a recording control apparatus according to claim 16.

* * * * *